(12) United States Patent
Yang et al.

(10) Patent No.: US 9,555,848 B2
(45) Date of Patent: Jan. 31, 2017

(54) GROUND SLIDING TYPE FLEXIBLE FRAMING SYSTEM

(71) Applicant: Guangzhou MINO Automotive Equipment Co., Ltd., Guangzhou (CN)

(72) Inventors: Meng Yang, Guangzhou (CN); Weibing Yao, Guangzhou (CN); Bangchao Qiu, Guangzhou (CN); Junhui Li, Guangzhou (CN); Zhilin Zhang, Guangzhou (CN); Yi He, Guangzhou (CN)

(73) Assignee: GUANGZHOU MINO AUTOMOTIVE EQUIPMENT CO. LTD., Guangzhou (CN)

( * ) Notice: Subject to any disclaimer, the term of this patent is extended or adjusted under 35 U.S.C. 154(b) by 0 days.

(21) Appl. No.: 14/856,955

(22) Filed: Sep. 17, 2015

(65) Prior Publication Data

US 2016/0288849 A1   Oct. 6, 2016

(30) Foreign Application Priority Data

Apr. 1, 2015   (CN) .......................... 2015 1 0152392
Apr. 23, 2015  (CN) .......................... 2015 1 0202371
Apr. 27, 2015  (CN) .......................... 2015 1 0204993

(51) Int. Cl.
*B65G 43/08*   (2006.01)
*B62D 65/18*   (2006.01)
*B65G 17/12*   (2006.01)
*B65G 17/32*   (2006.01)

(52) U.S. Cl.
CPC .............. *B62D 65/18* (2013.01); *B65G 17/12* (2013.01); *B65G 17/32* (2013.01)

(58) Field of Classification Search
CPC ...................................................... B62D 65/18

USPC ..................... 198/347.1, 347.4, 346.2, 468.9
See application file for complete search history.

(56) References Cited

FOREIGN PATENT DOCUMENTS

CN        103625578 A  *  3/2014

OTHER PUBLICATIONS

CN103625578A, English language translation identified as CN103625578A-1.*
CN103625578A, English language translation identified as CN103625578A-2.*

* cited by examiner

*Primary Examiner* — Gene Crawford
*Assistant Examiner* — Lester Rushin
(74) *Attorney, Agent, or Firm* — M&B IP Analysts, LLC

(57) ABSTRACT

The embodiments disclose a ground sliding type flexible framing system, comprising a vehicle body transport system, welding systems, framing fixtures, a splicing system, a fixture storage system and a fixture switching system. The fixture storage system comprises a plurality of bidirectional sliding rails arranged in parallel, storage positions for storing framing fixtures are formed on the bidirectional sliding rails, and the fixture switching system comprises a left and a right sliding table transport rail which are led to two sides of the splicing system from two ends of the bidirectional sliding rails, fixture transport rails led to the left and the right sliding table transport rail from two sides of the splicing system, respectively, sliding tables capable of running on the left and the right sliding table transport rail and a transport mechanism capable of pulling the framing fixtures positioned on the bidirectional sliding rails and the fixture transport rails.

15 Claims, 6 Drawing Sheets

GROUND SLIDING TYPE FLEXIBLE FRAMING SYSTEM

CROSS-REFERENCE TO RELATED APPLICATIONS

This application claims priority under 35 USC 119 from Chinese Application No. 201510152392.8 CN, filed Apr. 1, 2015, now pending, Chinese Application No. 201510202371.2 CN, filed Apr. 23, 2015, now pending, Chinese Application No 201510204993.9 CN, filed Apr. 27, 2015, now pending.

TECHNICAL FIELD

The disclosed embodiments generally relate to vehicle production and manufacture, and particularly relate to a ground sliding type flexible framing system.

BACKGROUND

With the development of the times, the quantity demanded for vehicles rapidly increases, meantime, demands for individuation and selecting diversification of the vehicles grow, and vehicle industry develops to the tendencies of small batches and multiple types. For vehicle producers, produced vehicle models are increased, more production lines are needed, and in order to save production cost and meet capacity demand at the same time, single-vehicle model production lines are in urgent need to be integrated into a multi-vehicle model compatible production line, namely, a flexible production system.

At present, a fixture switching trolley and a fixture of a ground sliding type framing system adaptive to multi-vehicle model production requirements share one set of rail. During rails docking, it is necessary to provide another set of positioning mechanism to control the docking precision to ensure that both the fixture switching trolley and the fixture can pass through the rail, and the requirement on repeating precision is high, the control is complex, both the reliability and stability are low. As fixture storage positions of a split fixture base are divided left and right, the occupation space is large, left and right circulation of the fixtures cannot be realized. Because a switching manner of the fixtures is single, the needs of high frequency fixture switching and production line maintaining brought by production of multiple types of vehicles in the future cannot be met.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

In order to solve the above problems, the disclosed embodiments provide a ground sliding type flexible framing system, fixtures on fixture positions can bidirectionally slide left and right, the switching manner is more flexible, the switching period is shortened, and the occupation space is reduced, thus the requirements on random fixture switching during multi-vehicle model co-line production are met.

A technical solution adopted by the disclosed embodiments to solve the technical problems is: a ground sliding type flexible framing system, comprising a vehicle body transport system, welding systems, framing fixtures, a splicing system for driving the framing fixtures to clamp a vehicle body, a fixture storage system and a fixture switching system for realizing switching of the framing fixtures between the splicing system and the fixture storage system; the fixture storage system comprises a plurality of bidirectional sliding rails arranged in parallel, storage positions for storing the framing fixtures are formed on the bidirectional sliding rails, and the fixture switching system comprises a left sliding table transport rail and a right sliding table transport rail which are lead to two sides of the splicing system from two ends of the bidirectional sliding rails, fixture transport rails leading to the left sliding table transport rail and the right sliding table transport rail from two sides of the splicing system respectively, sliding tables capable of running on the left sliding table transport rail and the right sliding table transport rail, and a transport mechanism capable of pulling the framing fixtures positioned on the bidirectional sliding rails and the fixture transport rails.

As a further improvement to the technical solution of the disclosed embodiments, the transport mechanism comprises transport trolleys arranged at the fixture transport rails and one side of each bidirectional sliding rail, respectively, the transport trolleys comprise trolley transport guide rails parallel with the corresponding fixture transport rails or bidirectional sliding rails and trolleys bracket capable of running along the trolley transport guide rails, and the trolley brackets are provided with driving pulling swing arms capable of pulling the framing fixtures.

As a further improvement to the technical solution of the disclosed embodiments, the ground sliding type flexible framing system also comprises a guide rail mounting frame, the trolley transport guide rails comprise upper guides rail and lower guide rails mounted on the guide rail mounting frame, first racks are arranged between the upper guide rails and the lower guide rails, the trolley brackets are provided with first guide devices, driving motors and first gears arranged on output shafts of the driving motors and meshed with the first racks, the trolley brackets are arranged on the upper guide rails and the lower guide rails by means of the first guide devices and run on the trolley transport guide rail in a meshing transmission manner between the first gears and the first racks, and the driving pulling swing arms are arranged at both front and rear ends of the trolley brackets.

As a further improvement to the technical solution of the disclosed embodiments, at least two groups of first guide devices are arranged on the trolley brackets, the trolley brackets hold the upper guide rails and the lower guide rails by the first guide devices, the first guide devices comprise mounting seats, and the mounting seats are provided with U-shaped guide slots for holding the upper guide rails and the lower guide rails.

As a further improvement to the technical solution of the disclosed embodiments, first wheel groups are arranged at two side walls and bottoms of the U-shaped guide slots.

As a further improvement to the technical solution of the disclosed embodiments, the trolley brackets are provided with hinge mounting seats connected with the first guide devices, and the hinge mounting seats are connected with the mounting seats by vertical first pin shafts.

As a further improvement to the technical solution of the disclosed embodiments, the driving pulling swing arms comprise cylinder mounting seats arranged on the trolley brackets, pulling blocks arranged at the top of the cylinder mounting seats by hinge shafts, cylinders arranged on the cylinder mounting seats and swing arms arranged on the cylinder mounting seats by rotary shafts and driven by the cylinders to rotate, the swing arms are connected with the pulling blocks by connecting rods, the cylinders drive the swing arms to rotate, and the pulling blocks are driven by the swing arms through the connecting rods to rotate around the hinge shafts so as to be matched with or released from the framing fixtures.

As a further improvement to the technical solution of the disclosed embodiments, idler wheels capable of being matched with the framing fixtures and pulling the same are arranged at the ends of the pulling blocks.

As a further improvement to the technical solution of the disclosed embodiments, the pulling blocks are provided with proximity switches for detecting whether the idler wheels are matched with the framing fixtures.

As a further improvement to the technical solution of the disclosed embodiments, drag chain brackets are arranged at one side of the trolley transport guide rails, and cables of the trolley brackets are arranged in drag chains of the drag chain brackets.

As a further improvement to the technical solution of the disclosed embodiments, the splicing system comprises splicing sliding rails vertical to a transport direction of the vehicle body transport system, splicing trolleys capable of driving the framing fixtures to move along the splicing sliding rails and positioning systems capable of positioning and clamping the framing fixtures.

As a further improvement to the technical solution of the disclosed embodiments both the left sliding table transport rail and the right sliding table transport rail comprise two parallel guide rails, the sliding tables are transversely erected on the two guide rails by second guide devices, second racks are arranged along each guide rail, motors are arranged between the guide rails at two sides on the sliding tables, driving seats corresponding to the racks at two sides are arranged at two sides of the motors on the slide tables, the driving seats are provided with second gears driven by the motors and meshed with the second racks at corresponding sides, the second guide devices comprise wheel group mounting seats, and the wheel group mounting seats are provided with second wheel groups capable of being matched with the guide rails.

As a further improvement to the technical solution of the disclosed embodiments, one wheel group mounting seat is arranged at each of inner and outer sides of the guide rails, guide slots for mounting the second wheel groups are arranged at the side surfaces of the wheel group mounting seats, and the second wheel groups comprise bearing wheels arranged at the side walls of the top of the guide slots and capable of being matched with the top surfaces of the guide rails, transverse adjusting wheels arranged at the sides of the guide slots and capable of being matched with the side surface of the guide rails and longitudinal adjusting wheels arranged at the side walls of the bottoms of the guide slots and capable of being matched with the bottom surfaces of the guide rails.

As a further improvement to the technical solution of the disclosed embodiments, the bearing wheels are concentric idler wheels, and the transverse adjusting wheels and the longitudinal adjusting wheels are eccentric idler wheels of which the distances from the guide rails can be adjusted by rotating.

As a further improvement to the technical solution of the disclosed embodiments, the sliding tables are provided with hinge mounting seats connected with the second guide devices, and the hinge mounting seats are connected with the wheel group mounting seats by second pin shafts.

As a further improvement to the technical solution of the disclosed embodiments, transmission shafts are arranged on the driving seats at two sides of the motors, two sides of the transmission shafts on the driving seats are driving ends and driven ends, respectively, the driving ends of the transmission shafts are connected with the driving shafts of the motors by universal couplers, the second gears are arranged at the driven ends of the transmission shafts, one ends of the universal couplers are connected with the driving ends of the transmission shafts by first flanges, and the other ends of the universal couplers are connected with the driving shafts of the motors by second flanges and expansion sleeves.

The disclosed embodiments have the beneficial effects that in the ground sliding type flexible framing system, the fixture storage system can be provided with multiple bidirectional sliding rails according to needs of vehicle model quantity, the storage positions for storing the framing fixtures are formed on the bidirectional sliding rails, the framing fixtures can bidirectionally slide left and right on the storage positions, the framing fixtures corresponding to welded vehicle models are further transported to the splicing system by the fixture switching system, meanwhile, the vehicle body transport system conveys the vehicle bodies to preset positions, the splicing system positions and fixes the vehicle body, and the welding systems finish the welding work of a white vehicle body. The switching manner of the framing fixtures of the disclosed embodiments is more flexible, the switching period is shortened, and the occupation space is reduced, thus the requirements on the random fixture switching during multi-vehicle model co-line production of vehicles in the future are met.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
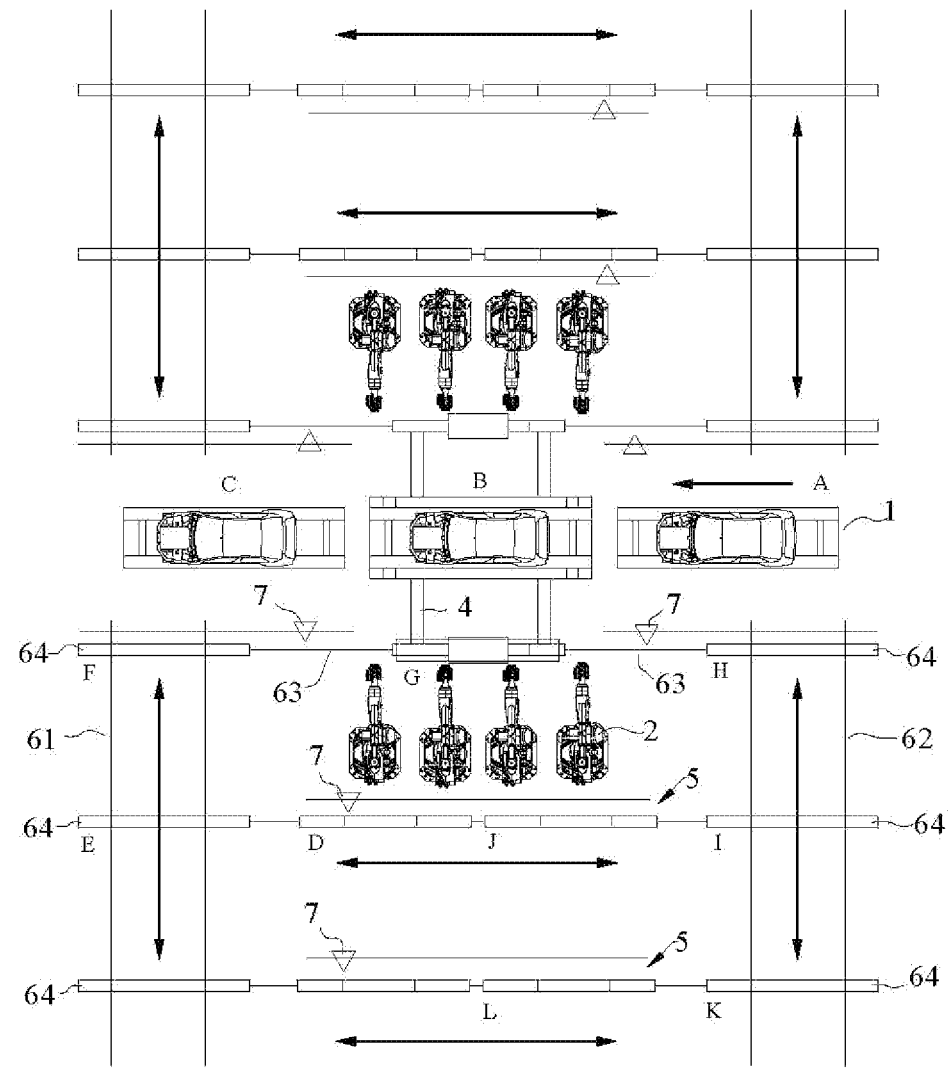
FIG. 1 is an integral structure schematic diagram according to one embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

With reference to FIGS. 1-11 which show specific structures of preferable embodiments of the disclosure, structure features of all elements of the disclosed embodiments are described in detail as follows.

As shown in FIG. 1, the disclosed embodiments provide a ground sliding type flexible framing system which comprises a vehicle body transport system 1, a floor positioning system, welding systems 2, framing fixtures 3, a splicing system 4 for driving the framing fixtures 3 to clamp a vehicle body, a fixture storage system 5 and a fixture switching system for realizing switching of the framing fixtures 3 between the splicing system 4 and the fixture storage system 5. The floor positioning system is mainly used for positioning and fixing a floor of a white vehicle body and is arranged in the middle of the vehicle transport system 1. The framing fixtures 3 comprise fixture bases 31 and fixture bodies 32 arranged on the fixture bases 31, and the fixture storage system 5 is positioned at one side of the welding systems 2 away from the vehicle body transport system 1. The splicing system 4 is used for positioning and fixing of a top cover, a side wall and a floor of the white vehicle body, and the splicing system 4 is positioned between the welding systems 2 and the vehicle body transport system 1. The fixture storage system 5 comprises a plurality of bidirectional sliding rails 51 arranged in parallel, storage positions for storing the framing fixtures 3 are formed on the bidirectional sliding rails 51, and the fixture switching system comprises a left sliding table transport rail 61 and a right sliding table transport rail 62 which are led to two sides of the splicing system 4 from two ends of the bidirectional sliding rails 51, fixture transport rails 63 led to the left sliding table transport rail 61 and the right sliding table transport rail 62 from two sides of the splicing system 4, respectively, sliding tables 64 capable of running on the left sliding table transport rail 61 and the right sliding table transport rail 64, and a transport mechanism capable of pulling the framing fixtures 3 positioned on the bidirectional slid rails 51 and the fixture transport rails 63.

Figure 2:
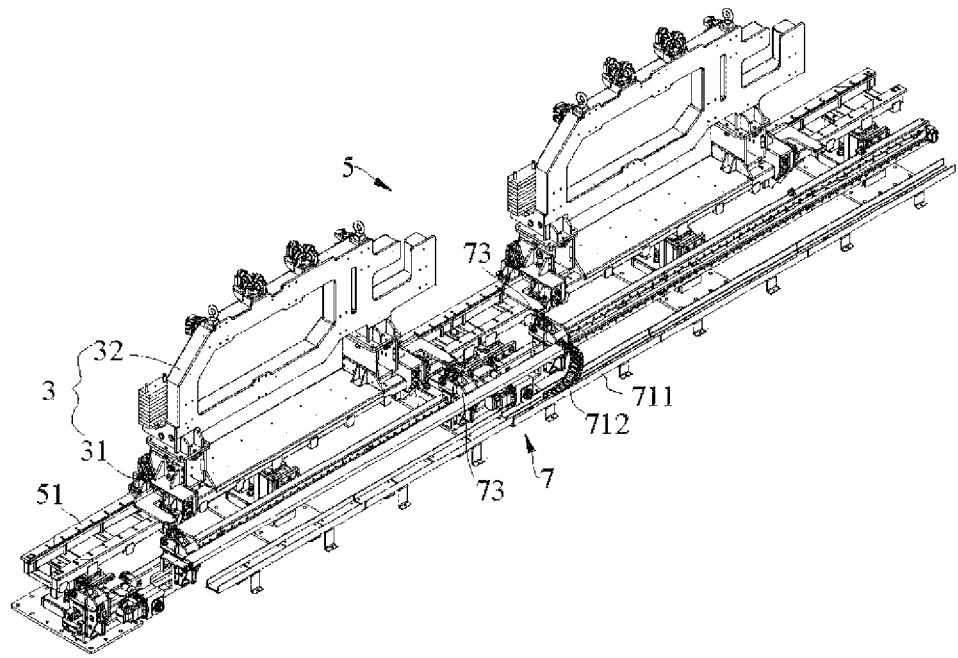
FIG. 2 is a structure schematic diagram of a fixture storage system according to one embodiment.
Figure 3:
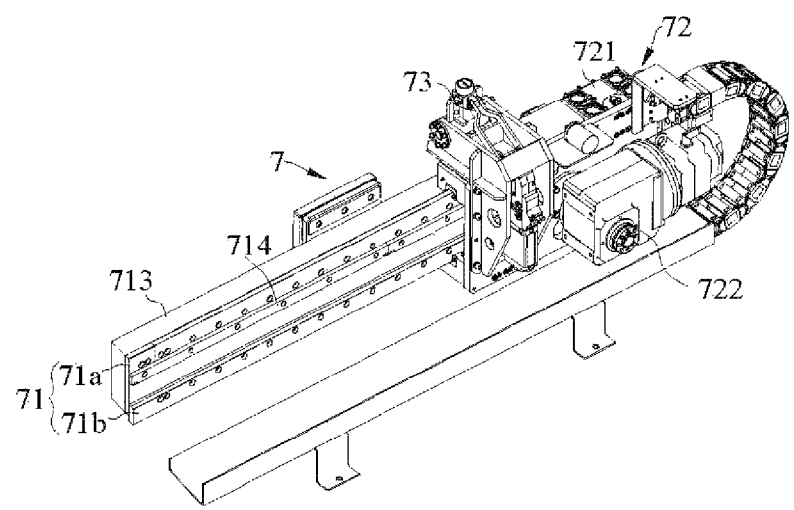
FIG. 3 is a structure schematic diagram of transport trolleys according to one embodiment.
Figure 6:
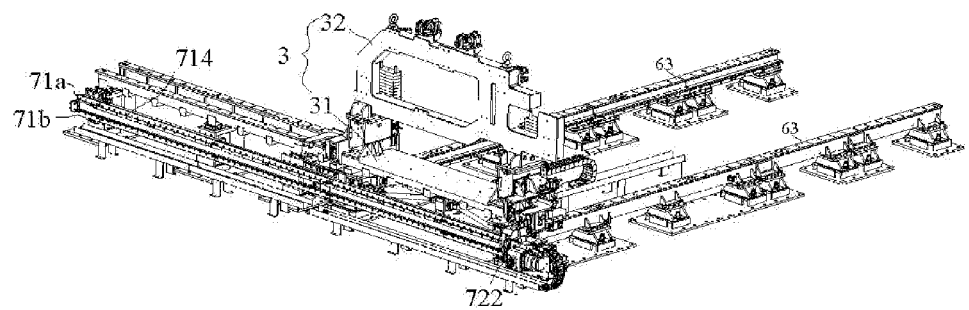
FIG. 6 is a structure schematic diagram of the framing fixtures according to one embodiment.

With reference FIGS. 2, 3 and 6, the transport mechanism comprises transport trolleys 7 which are arranged on the fixture transport rails 63 and one side of each bidirectional sliding rail 51, the transport trolleys 7 comprises trolley transport guide rails 71 parallel with the corresponding fixture transport rails 63 or corresponding bidirectional rails 51 and trolley brackets 72 capable of running along the trolley transport guide rails 71, the trolley transport guide rails 71 are separated from the fixture transport rails 63 and the bidirectional sliding rails 51, which are high in production efficiency, low in requirement on jointing repeat precision, good in switching stability, convenient to maintain and wide in applicable vehicle model and meet the automated welding requirement of multiples vehicle models of white vehicle bodies. Drag chain brackets 711 are arranged at one side of the trolley transport guide rails 71, cables of the trolley brackets 72 are arranged in drag chains 712 on the drag chain brackets 711. Driving pulling swing arms 73 are provided on the trolley brackets 72 to pull the framing fixtures 3. The framing fixtures 3 can be driven by the trolley brackets 72 through the driving pulling swing arms 73 to reciprocate on the fixture transport rails 63 and the bidirectional sliding rails 51.

With reference to FIGS. 2 and 3, the ground sliding type flexible framing system also comprises guide rail mounting frames 713, the trolley transport guide rails 71 comprise upper guide rails 71a and lower guide rails 71b mounted on the guide rail mounting frames 713, the trolley transport guide rails 71 can be arranged on the ground or other fixed positions by the guide rail mounting frames 713 according to needs of actual working conditions, first racks 714 are arranged between the upper guide rails 71a and the lower guide rails 71b, the trolley brackets 72 are provided with first guide devices 721, driving motors 722 and first gears 723 arranged on output shafts of the driving motors 722 and meshed with the first racks 714, the trolley brackets 72 are arranged on the upper guide rails 71a and the lower guide rails 71b by the first guide devices 721 and run on the trolley transport guide rails 71 in a meshing transmission manner between the first gears 723 and the first racks 714, the driving pulling swing arms 73 are arranged at both front and rear ends of the trolley brackets 72, and two or single of the driving pulling swing arms 73 can work at the same time according to needs of actual working conditions so as to realize flexible production.

Figure 4:
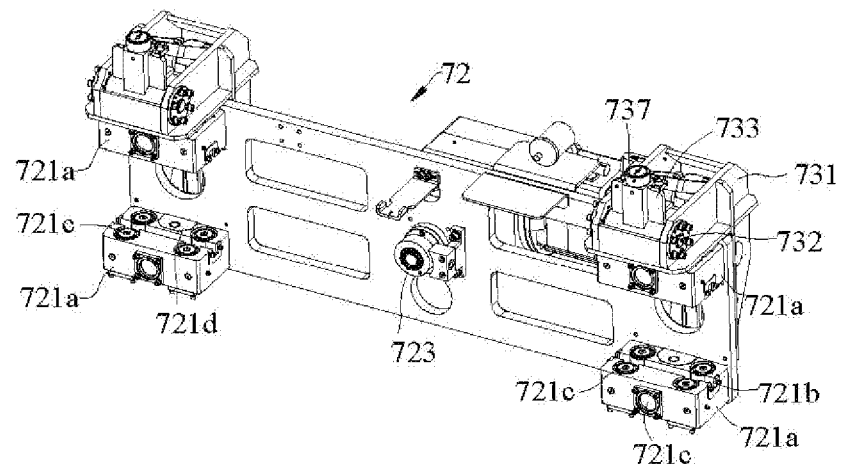
FIG. 4 is a structure schematic diagram of trolley brackets according to one embodiment.

With reference to FIG. 4, four groups of first guide devices 721 are arranged on the trolley brackets 72, and the trolley brackets 72 hold the upper guide rails 71a and the lower guide rails 71b by the first guide devices 721, so the trolley brackets 72 can move more stably; the first guide devices 721 comprise mounting seats 721a, and U-shaped guide slots 721b holding the upper guide rails 71a and the lower guide rails 71b are arranged on the mounting seats 721a. First wheel groups 721c are arranged at the two sidewalls and slot bottom of the U-shaped guide slots 721b on the mounting seats 721a. The first wheel group 721c on each mounting seat 721a comprises 5 guide wheels and due to the combined action of the five guide wheels, the trolley brackets 72 have only one degree of freedom. Hinge mounting seats 721d connected with the first guide devices 721 are arranged on the trolley brackets 72, the hinge mounting seats 721d are connected with the mounting seats 721a by vertical first pin shafts, the trolley brackets 72 and the mounting seats 721a form hinge connection so as to resist slight deflection of the trolley transport rails 71 and prevent deviation of load to idler wheels at one side, overload of the idler wheels and reduction of the service life of the idler wheels.

Figure 5:
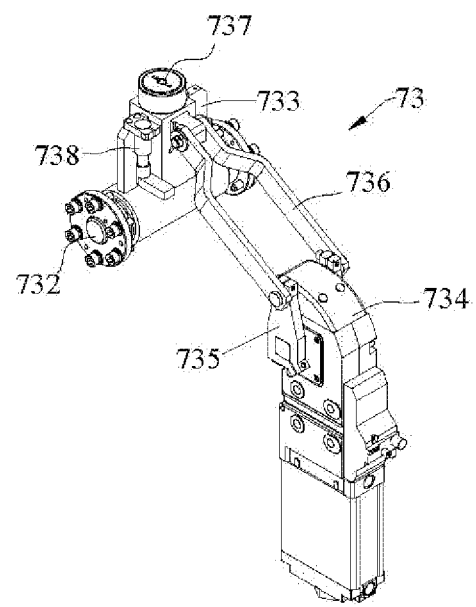
FIG. 5 is a structure schematic diagram of driving pulling swing arms according to one embodiment.

With reference to FIGS. 3 and 5, the driving pulling swing arms 73 comprise cylinder mounting seats 731 arranged on the trolley brackets 72, pulling blocks 733 arranged at the top of the cylinder mounting seats 731 by hinge shafts 732, cylinders 734 arranged on the cylinder mounting seats 731 and swing arms 735 arranged on the cylinder mounting seats 731 by rotary shafts and driven by the cylinders 734 to rotate, the swing arms 735 are connected with the pulling blocks 733 by connecting rods 736, the cylinders 734 drive the swing arms 735 to rotate, and the pulling blocks 733 are driven by the swing arms 735 through the connecting rods 736 to rotate around the hinge shafts 732 so as to be matched with or released from the framing fixture 3. Idler wheels 737 capable of being matched with the framing fixtures 3 and pulling the same are arranged at the ends of the pulling blocks 733. The swing arms 735 are driven to rotate for 90 degrees by taking the cylinders 724 arranged on the cylinder mounting seats 731 as a power source, and power is transmitted to the pulling blocks 733 by action of the connecting rods 736, so that the pulling blocks 733 rotate for 90 degrees, and idler wheels 737 arranged on the pulling blocks are matched with or released from the framing fixtures 3, and the driving of the framing fixtures 3 is realized. By a dual-rocker mechanism, the idler wheels 737 are matched with the framing fixtures 3, so the aims of replacing slide friction with rolling friction and prolonging service life of equipment are realized. Proximity switches 738 for detecting whether the idler wheels 737 and the framing fixtures 3 are matched are arranged on the pulling blocks 733.

Figure 7:
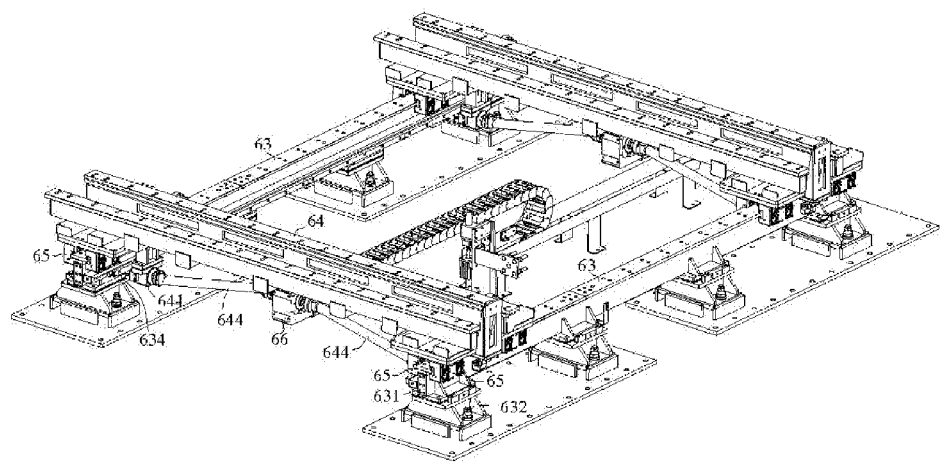
FIG. 7 is a structure schematic diagram of a left sliding table transport rail or a right sliding table transport rail and sliding tables according to one embodiment.
Figure 8:
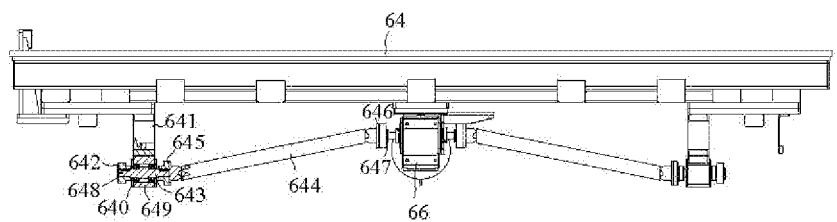
FIG. 8 is a structure schematic diagram of motor transmission parts on the sliding tables according to one embodiment.
Figure 10:
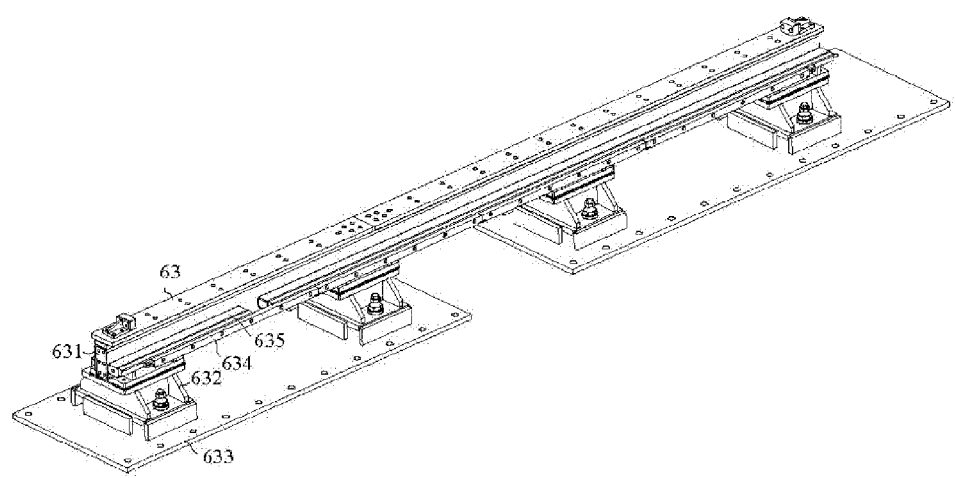
FIG. 10 is a structure schematic diagram of guide rails, guide rail mounting seats, heightening tables and bed plates according to one embodiment.

With reference to FIGS. 7, 8 and 10, both the left sliding table transport rail 61 and the right sliding table transport rail 62 comprise two parallel guide rails 63, guide rail mounting seats 631, heightening tables 632 and bed plates 633, the bed plates 633 are fixed on the ground by chemical bolts, the heightening tables 632 are assembled on the bed plates 633 by adjusting bolts, and the bed plates 633 are provided with welding rods around the heightening tables 632. The guide rails 63 are arranged on the guide rail mounting seats 631, the guide rail mounting seats 631 are fixed at the top of the heightening tables 632, the lifting heights of the heightening tables 632 are adjusted by the adjusting bolts welded on the bed plates 633, so the vertical height of the guide rails 63 fixed on the guide rail mounting seats 631 is adjusted. The sliding tables 64 are transversely erected on the two guide rails 63 by second guide devices 65, second racks 634 are arranged along each guide rail 63, and the second racks 634 are fixedly arranged at the side walls of the guide rail mounting seats 631 by rack mounting seats 635. Motors 66 are arranged between the guide rails 63 at two sides on the sliding tables 64, driving seats 641 corresponding to the racks 634 at two sides are arranged at two sides of the motors 66 on the sliding tables 64, the driving seats 641 are provided with second gears 642 driven by the motors 66 and meshed with the second racks 634 at corresponding sides, the motors 66 drive the second gears 642 and drive a load arranged on the sliding tables 64 to reciprocate by meshing of the second gears 642 and the second racks 634.

Figure 9:
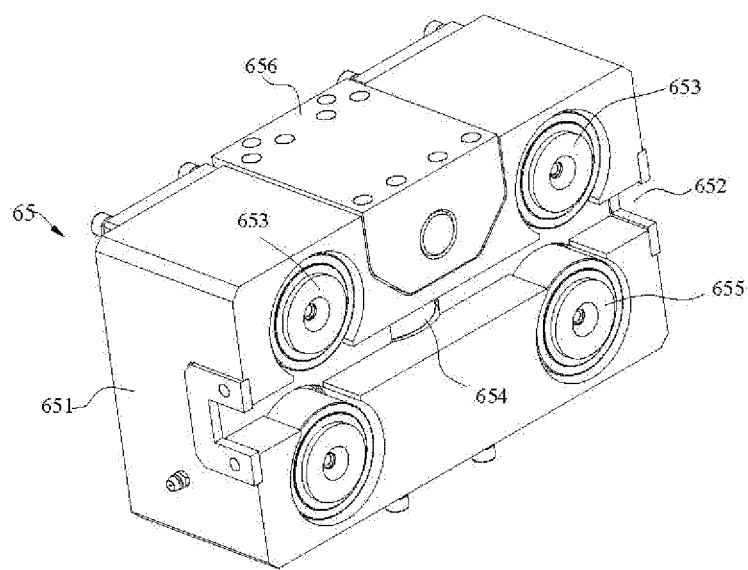
FIG. 9 is a structure schematic diagram of second guide devices according to one embodiment.

With reference to FIG. 9, the second guide devices 65 comprise wheel group mounting seats 651, and the wheel group mounting seats 651 are provided with second wheel groups capable of being matched with the guide rails 63. One wheel group mounting seat 651 is arranged at each of the inner and outer sides of the guide rails 63, guide slots 652 for mounting the second wheel groups are arranged at the side surfaces of the wheel group mounting seats 651, and the second wheel groups comprise bearing wheels 653 arranged at the side walls of the top of the guide slots 652 and capable of being matched with the top surfaces of the guide rails 63, transverse adjusting wheels 654 arranged at the slot sides of the guide slots 652 and capable of being matched with the side surfaces of the guide rails 63 and longitudinal adjusting wheels 655 arranged at the side walls of the bottoms of the guide slots 652 and capable of being matched with the bottom surfaces of the guide rails 63. The bearing wheels 653 are concentric idler wheels and the transverse adjusting wheels 654 and the longitudinal adjusting wheels 655 are eccentric idler wheels of which the distances from the guide rails 63 can be adjusted by rotating. Hinge mounting seats 656 connected with the second guide devices 65 are arranged on the sliding tables 64, and the hinge mounting seats 656 are connected with the wheel group mounting seats 651 by second pin shafts and form hinge connection so as to resist slight deflection of the guide rails 63, and prevent deviation of load to the idler wheels at one side, overload of the idler wheels and reduction of service life of the idler wheels; a work principle of the second guide devices 65 is that through mutual match between concentric idler wheels as the bearing wheels 653 of the second guide devices and the longitudinal adjusting wheels 655 below the bearing wheels, the longitudinal degree of freedom of the rail brackets is limited, by rotating the longitudinal adjusting wheels, gaps between the longitudinal adjusting wheels 65 and the guide rails 63 are adjusted, and the size of the gaps can be adjusted according to working condition needs. The work principle of the transverse adjusting wheels 654 is consistent with that of the longitudinal adjusting wheels, and transverse gaps between the two transverse adjusting wheels 654 and the guide rails 63 are adjusted by rotating the two transverse adjusting wheels 654 so as to meet working condition needs.

With reference to FIGS. 7 and 8, transmission shafts 643 are arranged at driving seats 641 at two sides of the motors 66, two sides of the transmission shafts 643 on the driving seats 641 are driving ends and driven ends, the driving ends of the transmission shafts 643 are connected with the driving shafts of the motors 66 by universal couplers 644, one ends of the universal couplers 644 are connected with the driving ends of the transmission shafts 643 by first flanges 645, and the other ends of the universal couplers 644 are connected with the driving shafts of the motors 66 by second flanges 646 and expansion sleeves 647. Due to the connection of the expansion sleeves 647, the universal couplers 644 at two ends of the driving shafts 643 have better synchronism; the second gears 642 are arranged at the driven ends of the transmission shafts 643 by keys and glands 648. The driving seats 641 are provided with bearing blocks 649. The transmission shafts 643 are arranged on the bearing blocks 649 by bearings and bearing glands 640 outside the bearings. Power of the motors 66 is transmitted out by driving shafts fixed on the motors; the power is transmitted to the transmission shafts 643 by the universal couplers 644; the transmission shafts 643 have only one degree of freedom under the combined action of the bearings, bearing glands 640 and bearing blocks 649; the interiors of the bearing blocks 649 and the driving seats 641 are fixed by bolts; the driving seats 641 and the sliding tables 64 are fixed; the second gears 642 are fixed at the driven ends of the transmission shafts 643 by the action of the keys, so the second gears and the transmission shafts integrally rotate at high speed. Transmission structures at two sides of the motors 66 are consistent, and motion of the second gears 642 at two sides is consistent due to abovementioned structure, so the phenomenon of instable operation due to overlarge shake of a unilateral drive load is solved.

Figure 11:
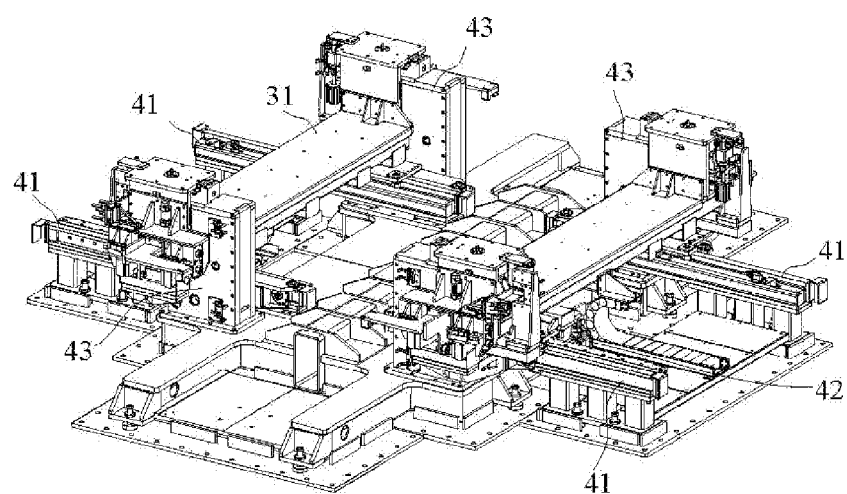
FIG. 11 is a structure schematic diagram of a splicing system according to one embodiment.

With reference to FIG. 11, the splicing system 4 comprises splicing sliding rails 41 perpendicular to the transport direction of the vehicle body transport system 1, splicing trolleys 42 capable of driving the framing fixtures 3 to move along the splicing sliding rails 41 to clamp the vehicle body and positioning systems 43 capable of positioning and clamping the framing fixtures 3. The splicing sliding rails 41 are distributed at two sides of the floor positioning system, the sliding direction of the splicing sliding rails 41 is perpendicular to the vehicle body moving direction, and a peripheral fixture platform can be matched with the floor positioning system to realize complete positioning of the white vehicle body.

A work principle of the technical solution is referred to FIG. 1, at an initial state, the framing fixture 3 is positioned at a D position of the storage positions of the fixture storage system 5, and is transported to an E position by the transport trolleys 7, after being positioned and clamped by the sliding tables 64, the framing fixture is 3 driven by the sliding tables 64 to move to an F position, and is transported to a G position by the transport trolleys 7. Meanwhile, the white vehicle body is transported to a B position from an A position under driving of the vehicle body transport system 1, and is fixed on the floor positioning system by a lifting roller bed. At the moment, the framing fixture 3 positioned at the G position is transported to the B position by the splicing sliding rails 41, and finishes complete positioning of the vehicle body by the positioning system. Meanwhile, the welding systems 2 start the welding work. After welding, the framing fixture 3 returns back to the G position on the splicing sliding rails 41, then the framing fixture 3 arrives at an H position under driving of the transport trolleys 7, moves to an I position by the sliding tables 64, and finally returns back to a J position of the fixture storage positions of the fixture storage system 5 by the transport trolleys 7, and certainly, according to needs, the framing fixture 3 can arrive at a K position under driving of the sliding tables and then arrive at an L position or other needed positions under driving of the transport trolleys 7. The welded white vehicle body moves to the C position from the B position by the vehicle body transport system 1, the white vehicle body at the A position moves to the B position and the framing fixture 3 of the next vehicle model moves onto the sliding tables 64 to prepare for next circulation under driving of the transport trolleys 7, thus finishing the switching of the framing fixtures 3.

Certainly, the disclosure is not limited to above embodiments, those skilled in the art can make equal transformation or substitution under the premise of not deviating from the spirit of the disclosed embodiments, and those transformations or substitutions should be contained in the scope defined by claims.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A ground sliding type flexible framing system, comprising a vehicle body transport system, welding systems, framing fixtures, a splicing system for driving the framing fixtures to clamp a vehicle body, a fixture storage system, a transport mechanism capable of pulling the framing fixtures and a fixture switching system for realizing switching of the framing fixtures between the splicing system and the fixture storage system; wherein the fixture storage system comprises a plurality of bidirectional sliding rails arranged in parallel, wherein storage positions for storing the framing fixtures are formed on the bidirectional sliding rails, wherein the fixture switching system comprises a left sliding table transport rail and a right sliding table transport rail, the splicing system having at least two sides, the bidirectional sliding rails having at least two ends, wherein the left sliding table transport rail and the right sliding table transport rail are led to two sides of the at least two sides of the splicing system from two ends of the at least two ends of the bidirectional sliding rails, wherein fixture transport rails led to the left sliding table transport rail and the right sliding table transport rail from two sides of the splicing system, respectively, wherein the sliding tables are capable of running on the left sliding table transport rail and the right sliding table transport rail, wherein the transport mechanism is positioned on the bidirectional sliding rails and the fixture transport rails, wherein the transport mechanism further comprises transport trolleys arranged at one side of the fixture transport rails and of each bidirectional sliding rail, respectively, wherein the transport trolleys further comprise trolley transport guide rails that are parallel with the corresponding fixture transport rails or bidirectional sliding rails and trolley brackets capable of running along the trolley transport guide rails, wherein the trolley brackets are provided with driving pulling swing arms capable of pulling the framing fixtures.

2. The ground sliding type flexible framing system according to claim 1, wherein the ground sliding type flexible framing system also comprises guide rail mounting frames, first racks, first guide devices, driving motors including output shafts, and first gears; wherein the trolley transport guide rails comprise upper guide rails and lower guide rails mounted on the guide rail mounting frames, wherein the first racks are arranged between the upper guide rails and the lower guide rails, wherein the trolley brackets are provided with the first guide devices, wherein the driving motors and the first gears are arranged on the output shafts of the driving motors and meshed with the first racks, wherein the trolley brackets are arranged on the upper guide rails and the lower guide rails by the first guide devices, wherein the trolley brackets are run on the trolley transport guide rails in a meshing transmission manner between the first gears and the first racks, the trolley brackets having front and rear ends, wherein the driving pulling swing arms are arranged at both of the front and rear ends of the trolley brackets.

3. The ground sliding type flexible framing system according to claim 2, wherein at least two groups of the first guide devices are arranged on the trolley bracket, wherein the trolley brackets hold the upper guide rails and the lower guide rails by the first guide devices, wherein the first guide devices comprise mounting seats, wherein the mounting seats are provided with U-shaped guide slots for holding the upper guide rails and the lower guide rails.

4. The ground sliding type flexible framing system according to claim 2, each of the U-shaped guide slots having two side walls and slot bottoms, wherein wheel groups are arranged at both of the two side walls and the slot bottoms of the U-shaped guide slots.

5. The ground sliding type flexible framing system according to claim 3, wherein the trolley brackets are provided with hinge mounting seats connected with the first guide devices, wherein the hinge mounting seats are connected with the mounting seats by vertical first pin shafts.

6. The ground sliding type flexible framing system according to claim 1, wherein the driving pulling swing arms comprise cylinder mounting seats arranged on the trolley brackets, pulling blocks arranged at the top of the cylinder mounting seats by hinge shafts, cylinders arranged on the cylinder mounting seats and swing arms arranged on the cylinder mounting seats by rotary shafts and driven by the cylinders to rotate, wherein the swing arms are connected with the pulling blocks by connecting rods, wherein the cylinders drive the swing arms to rotate, wherein the pulling blocks are driven by the swing arms through the connecting rods to rotate around the hinge shafts so as to be matched with or released from the framing fixtures.

7. The ground sliding type flexible framing system according to claim 6, wherein idler wheels capable of being matched with the framing fixtures and pulling the same are arranged at the ends of the pulling blocks.

8. The ground sliding type flexible framing system according to claim 7, wherein the pulling blocks are provided with proximity switches for detecting whether the idler wheels are matched with the framing fixtures.

9. The ground sliding type flexible framing system according to claim 1, wherein drag chain brackets are arranged at one sides of the trolley transport guide rails, and cables of the trolley brackets are arranged in drag chains of the drag chain brackets.

10. The ground sliding type flexible framing system according to claim 1, wherein the splicing system comprises splicing sliding rails perpendicular to a transport direction of the vehicle body transport system, splicing trolleys capable of driving the framing fixtures to move along the splicing sliding rails and positioning systems capable of positioning and clamping the framing frames.

11. The ground sliding type flexible framing system according to claim 1, wherein both the left sliding table transport rail and the right sliding table transport rail comprise two parallel guide rails, wherein the sliding tables are transversely erected on the two parallel guide rails of each of the left sliding table transport rail and the right sliding table transport rail by second guide devices, wherein second racks are arranged along each guide rail, wherein motors are arranged between the guide rails at two sides on the sliding tables, wherein driving seats corresponding to the racks at two sides are arranged at two sides of the motors on the slide tables, wherein the driving seats are provided with second gears driven by the motors and meshed with the second racks at corresponding sides, wherein the second guide devices comprise wheel group mounting seats, wherein the wheel group mounting seats are provided with second wheel groups capable of being matched with the guide rails.

12. The ground sliding type flexible framing system according to claim 11, wherein one wheel group mounting seat is arranged at each of inner and outer sides of the guide rails, wherein guide slots for mounting the second wheel groups are arranged at the side surfaces of the wheel group mounting seats, wherein the second wheel groups comprise bearing wheels arranged at the side walls of the top of the guide slots that are capable of being matched with the top surfaces of the guide rails, transverse adjusting wheels arranged at the sides of the guide slots that are capable of being matched with the side surfaces of the guide rails and longitudinal adjusting wheels arranged at the side walls of the bottoms of the guide slots that are capable of being matched with the bottom surfaces of the guide rails.

13. The ground sliding type flexible framing system according to claim 12, wherein the bearing wheels are concentric idler wheels, wherein the transverse adjusting wheels and the longitudinal adjusting wheels are eccentric wheels for which the distances from the guide rails can be adjusted by rotating.

14. The ground sliding type flexible framing system according to claim 11, wherein the sliding tables are provided with hinge mounting seats connected with the second guide devices, wherein the hinge mounting seats are connected with the wheel group mounting seats by second pin shafts.

15. The ground sliding type flexible framing system according to claim 11, wherein transmission shafts are arranged at the driving seats at two sides of the motors, two sides of the transmission shafts on the driving seats are driving ends and driven ends, respectively, wherein the driving ends of the transmission shafts are connected with the driving shafts of the motors by universal couplers, wherein the second gears are arranged at the driven ends of the transmission shafts, wherein ends universal couplers are connected with the driving ends of the transmission shafts by first flanges, wherein the other ends of the universal couplers are connected with the driving shafts of the motors by second flanges and expansion sleeves.

* * * * *